Nov. 30, 1965  R. L. WALDEN  3,221,256
ELECTROSTATIC POSITION TRANSDUCER
Filed May 15, 1963  2 Sheets-Sheet 1

ROBERT L. WALDEN
INVENTOR.

BY R. E. Geauque

ATTORNEY

Nov. 30, 1965 R. L. WALDEN 3,221,256
ELECTROSTATIC POSITION TRANSDUCER
Filed May 15, 1963 2 Sheets-Sheet 2

ROBERT L. WALDEN
INVENTOR.

BY R.E. Geaugue

ATTORNEY

United States Patent Office 3,221,256
Patented Nov. 30, 1965

3,221,256
ELECTROSTATIC POSITION TRANSDUCER
Robert L. Walden, Woodland Hills, Calif., assignor to Whittaker Corporation, a corporation of California
Filed May 15, 1963, Ser. No. 280,506
5 Claims. (Cl. 328—1)

This invention relates to displacement measuring transducers and more particularly relates to an electrostatic transducer which provides the desirable features of a conventional electromagnetic synchro transmitter.

Various types of position transducers have been proposed heretofore; most of these prior devices may be described in terms of two generic types. The first type comprises devices based on the principle of electromagnetic induction and the second type comprises electrostatic devices. The two most important types of electromagnetic displacement transducers are the synchro/resolver type and the "Microsyn"/"Inductosyn" type. The synchro transmitter type is most widely used since the torque transmission characteristics of a synchro transmitter-receiver pair are unobtainable by other means. The electrostatic type of device has generally been used in those instances where resolution was of greater importance than torque transmission capability. Extremely high resolution has been obtained, heretofore, by electrostatic devices of the type shown and described in Patent No. 3,068,457, entitled Displacement Measuring Device and assigned to the same assignee as the present invention; however, such devices are relatively complex and expensive. Unfortunately, an electrostatic analogue of a synchro transmitter-receiver pair would be almost impossible to construct as a practical device. Obviously, the torque transmission characteristics of a synchro transmitter-receiver pair are impossible to obtain by electrostatic means.

A "Microsyn"/"Inductosyn" type of device is relatively easy, from a theoretical point of view, to convert to an electrostatic embodiment in order to obtain the favorable characteristics of electrostatic devices such as no null quadrature components, good linearity over a wide range of displacement, and better resolution. However, an "electrostatic microsyn" is impractical in most applications since its high output impedance is not compatible with convention circuit requirements. Circuit application difficulties are overcome by the present invention which provides a novel transducer having the desirable features of electrostatic devices yet which overcomes the undesirable characteristics of size, weight, cost, and sensitivity to stray fields exhibited by electromagnetic devices. In addition, the present invention retains the superior resolution of an electrostatic device yet provides a low output impedance.

One of the advantages of a conventional synchro device is that it may be excited directly from a 400 c.p.s. power line. Also, the low impedance output in the form of a phase/amplitude signal may be amplified and applied to standard servomotors without being demodulated or modified in any way. The circuits used with synchros are simple, relatively inexpensive, and have been proven over many years. To be competitive with conventional synchros, an electrostatic counterpart must be readily applied to conventional systems. Therefore, the inherent design of an electrostatic synchro must be subordinate to its external circuit requirements. The most difficult design objective to achieve is low output impedance. By the present invention there is provided a novel and improved electrostatic position transducer which fulfills the above stated objectives. The apparatus of the invention comprises a pair of relatively movable members (e.g., rotor and stator) each of which is provided with a number of novel conductor patterns. A mechanical displacement of one member relative to the other will cause a shift in the effective ground reference of the signals in one of the sets of conductors, thereby cyclically unbalancing the output as a function of displacement. Thus, the output intelligence is in the form of an amplitude modulated carrier having a phase shift which is determined by the sense of the input displacement. An integral circuit constructed in accordance with the invention modifies the output so that it appears as a low impedance source, and therefore, the output signal will be essentially the same as that obtainable from conventional synchro/resolver devices. The scope of the invention disclosed hereinafter includes both rotary and rectilinear position transducers, either of which may have a vacuum tube or a solid-state impedance matching circuit associated therewith.

It is therefore a principal object of the invention to provide a position transducer of novel and improved construction operating on the electrostatic principle yet which retains all the advantages and none of the disadvantages of electromagnetic devices heretofore intended for generally similar purposes.

Another object of the invention is to provide an electrostatic displacement position transducer which is simple to manufacture, reliable in operation, and relatively inexpensive.

Another object of the invention is to provide a novel and improved circuit for use with electrostatic transducers to provide a low output impedance.

Still another object of the invention is to provide a novel and improved displacement transducer which is superior to devices used heretofore for generally similar purposes.

These and other objects of the invention will become more apparent on consideration of the following specification and drawings in which.

The invention may be constructed in various embodiments, as dictated by application requirements. To be responsive to a rectilinear input, the transducer will comprise a pair of relatively movable elements of a generally linear elongate configuration having planar conductor patterns disposed thereon. The patterns may comprise thin films of metal supported on a dielectric substrate. To be responsive to angular displacement, the relatively movable elements should be of a generally circular configuration, with the conductor patterns disposed thereon in closed rings. In either case, the patterns must be arranged so that when one set of patterns is excited by an alternating-current carrier a capacitively-coupled voltage may be obtained from a second set of patterns which is a known function of the relative displacement between the relatively movable elements. To facilitate teaching of the invention, a rectilinear embodiment will be considered first.

Figure 1:
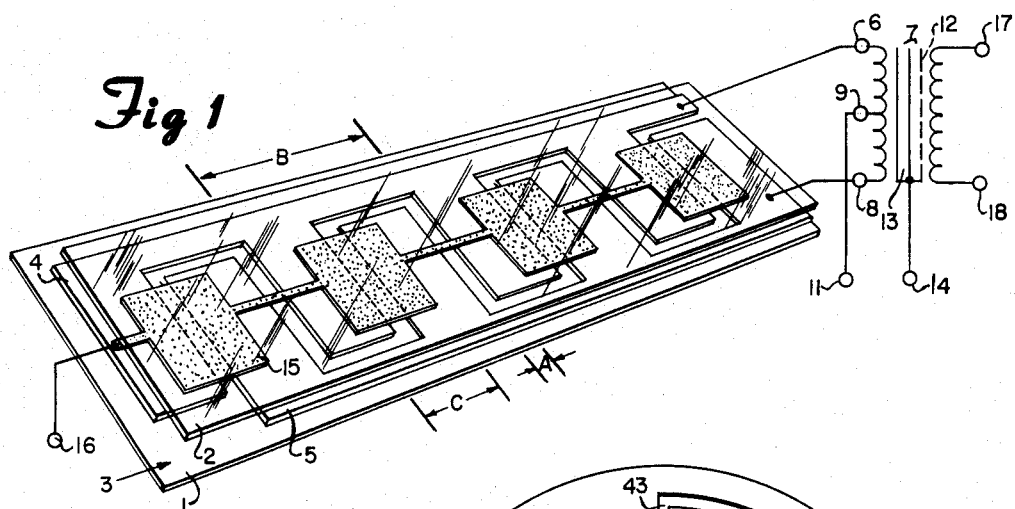
FIGURE 1 is a diagrammatic illustration of a first embodiment of the transducer of the invention for measuring rectilinear displacements.

Looking now at FIGURE 1, there is shown, in diagrammatic form, a first embodiment of the invention comprising a pair of dielectric substrates 1 and 2 which are separated by a small air gap 3. Substrates 1 and 2 may be glass or other suitable material upon which may be deposited metallic conductor patterns. For the sake of illustration, assume that substrate 1 is relatively fixed and substrate 2 is relatively movable. The conductor pattern on substrate 1 comprises a pair of elongate planar conductive members 4 and 5 each having a plurality of finger-like extensions which intermesh with each other as shown.

Member 4 is attached to terminal 6 of the secondary winding of transformer 7 and the alternate element 5 is connected to terminal 8 of the transformer secondary. The center tap 9 of the transformer secondary winding is connected to the output terminal 11. The secondary winding of transformer 7 is isolated from the primary winding by means of an electrostatic shield 12 and the transformer core 13 is connected to terminal 14.

The primary of transformer 7 is connected to terminals 17 and 18, which are supplied from a source of carrier power. Movable substrate 2 carries a plurality of rectangular conductor segments which are interconnected in series and comprise a pattern element called the coupler (identified as 15). The plurality of separate rectangular conductor segments comprising coupler 15 are in a common plane which is parallel to and spaced apart from the plane of substrate 1. Coupler 15 is connected to terminal 16.

Conductor member 4 is separated from member 5 by a gap of fixed width A which isolates the intermeshed finger portions one from another. One finger-like portion of element 4 together with an adjacent finger-like portion of element 5 comprises one pole pair having a physical pitch distance as indicated at B. The rectangular segments comprising the overlying coupler 15 have a width which is equal to one half of the pitch distance (B) of members 4 and 5. The mechanical input to the transducer physically moves substrate 2 and coupler 15 which is mounted thereon. Displacement of coupler 15 will result in a proportional change in the amplitude and phase of the capacitively coupled excitation carrier appearing across terminals 11 and 16. The inherently low-output impedance characteristic of the apparatus is obtained by means of a cathode follower circuit which is driven from terminals 11 and 16. A suitable circuit is shown in FIGURE 2.

Figure 2:
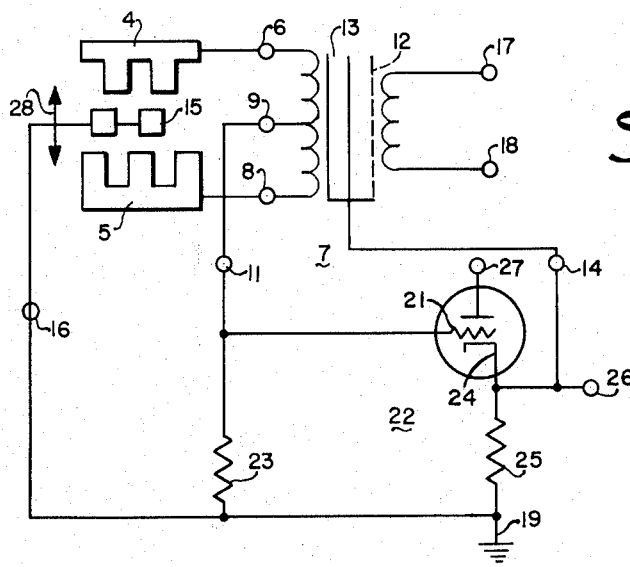
FIGURE 2 is a schematic circuit diagram of a first embodiment of the apparatus of the invention.

With particular reference to FIGURE 2, the transducer proper comprises coupler 15 which is connected to ground 19 via terminal 16. The center tap 9 is connected to the grid 21 of cathode follower 22. The grid 21 is also referred to ground 19 via grid resistor 23. The cathode resistor 25 is connected between cathode 24 and ground. Plate 27 is connected to a suitable source of operating potential (not shown). The output from the cathode follower appears as a low impedance source and is obtained between terminal 26 and ground 19.

A source of A.C. excitation voltage is applied to the primary winding of transformer 7 via terminals 17 and 18. Shield 12 and core 13 interposed between the primary and secondary windings are connected to cathode 24. Thus, the core 13 and shield 12 are driven essentially at the output level, eliminating most of the interwinding and ground capacities in the transformer.

In a typical construction, the apparatus of FIGURE 2, including the cathode follower, may be physically housed within a size 11 synchro shell, with the circuit components located immediately adjacent the moving elements. With this type of construction, the maximum effective input capacity of the cathode follower may be maintained within the range of 5 to 10 p.f.

A mechanical input, indicated by arrow 28, will cause coupler 15 to move with respect to conductive members 4 and 5. This action will shift the effective ground point in the transformer 7, causing the signal appearing at center tap 9 to shift with respect to ground 19 and thereby give an output signal at terminal 11.

It should be understood that the center tap of the transformer may be grounded and the ouput taken from the coupler conductor; however, practical considerations generally dictate that the coupler be grounded and the output taken from the center tap since this arrangement minimized the difficulty of making a rotatable electrical connection to the coupler.

The relatively low energy level (high impedance) of the signal appearing at terminal 11 requires linear amplification. However, this is readily obtained by means of the cathode follower and such additional stages of amplification as may be desired. Stable, reliable operation can be realized since the device is of a balanced electrostatic configuration.

Figure 3:
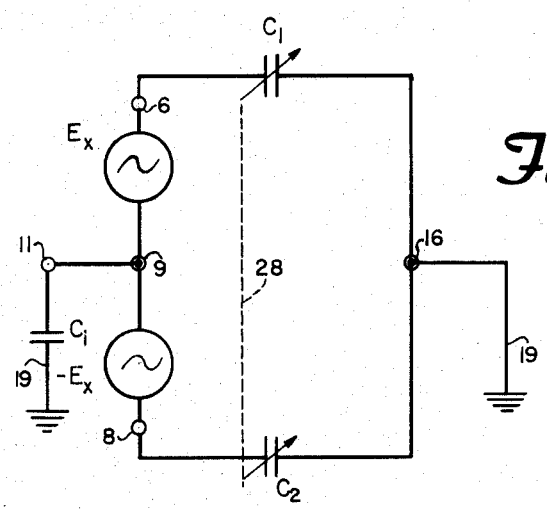
FIGURE 3 is an equivalent circuit of the apparatus of FIGURES 1 and 4.

To facilitate understanding the manner in which the transducer device functions, reference should be made to the equivalent circuit of FIGURE 3. The principal terminal points in FIGURE 3 having been given numbers corresponding to similar terminals in FIGURE 2. The single phase A.C. voltage from the carrier source is converted to a pair of excitation signals $E_x$ and $-E_x$, which are 180° out of phase, by means of the center tapped secondary of transformer. These excitation signals $E_x$ and $-E_x$ appear between terminals 6 and 9, as well as 8 and 9, respectively. The two excitation signals are applied to variable capacitances $C_1$ and $C_2$, respectively. Variable capacitors $C_1$ and $C_2$ represent the coupler and the driver conductive members. The capacity of $C_1$ and $C_2$ is varied by means of a mechanical input 28. One side of $C_1$ and $C_2$ is connected to a common terminal 16 which is connected to ground 19. The common terminal (center tap 9) of the two excitation voltages $E_x$ and $-E_x$ is connected to the input terminal 11 of the cathode follower 22. Capacitance $C_i$ represents all of the circuit capacitances of the transducer. The output signal $E_i$ appears at terminal 11.

Figure 4:
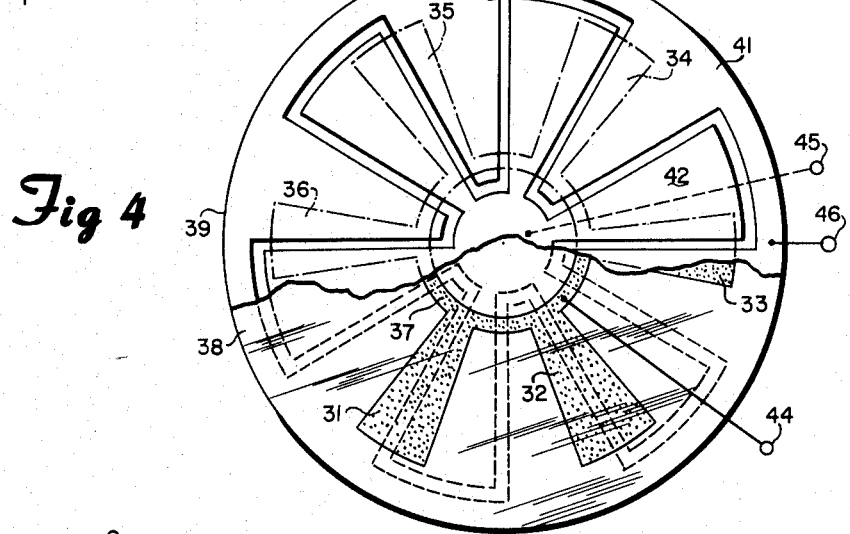
FIGURE 4 is a diagrammatic illustration of a second embodiment of the transducer of the invention for measuring angular displacement.

There is shown in FIGURE 4 a typical rotary embodiment of the transducer apparatus and is somewhat similar to the apparatus of FIGURE 1 except that the coupler segments 31–36 are arranged radially in a closed circle and interconnected by means of conductor 37. Coupler segments 31–36 are mounted on dielectric disc 38 for rotation therewith. Disc 38 is parallel to, and spaced apart from planar disc 39. The two intermeshed driver patterns 41 and 42 are radially disposed on the surface of fixed disc 39 facing movable disc 38. Pattern 41 is electrically isolated from pattern 42 by a narrow gap indicated at 43.

Terminal 44 is electrically connected to conductor 37 by any suitable means which may include a slip ring and brush or other rotating electrical connection, as will be apparent to those skilled in the art. Since the coupler assembly (31–37) is preferably grounded, the electrical interconnection between terminal 44 and conductor 37 is simplified.

Terminal 45 is connected to pattern 42 and terminal 46 is connected to pattern 41. The A.C. carriers are applied to terminals 45 and 46, and referenced to ground, in order to excite driver patterns 41 and 42. Since these elements are fixed, no slip rings or other rotary electrical connections need be employed.

It should be understood that only six pole pairs have been shown in FIGURE 4, for the sake of clarity, and that a considerably larger number of pole pairs would be employed in most practical embodiments of the device. In a typical construction of a rotary embodiment the diameter of the discs may be of the order of 2.5 inches, and carry forty-five pole pairs thereon.

The coupler assembly (31-37) averages the capacitive coupling between the rotor (38) and stator (39) elements over the total number of pole pairs in the transducer. This substantially eliminates errors which would otherwise arise from end and/or radial play and non-parallelism of the dielectric substrates.

Figure 5:
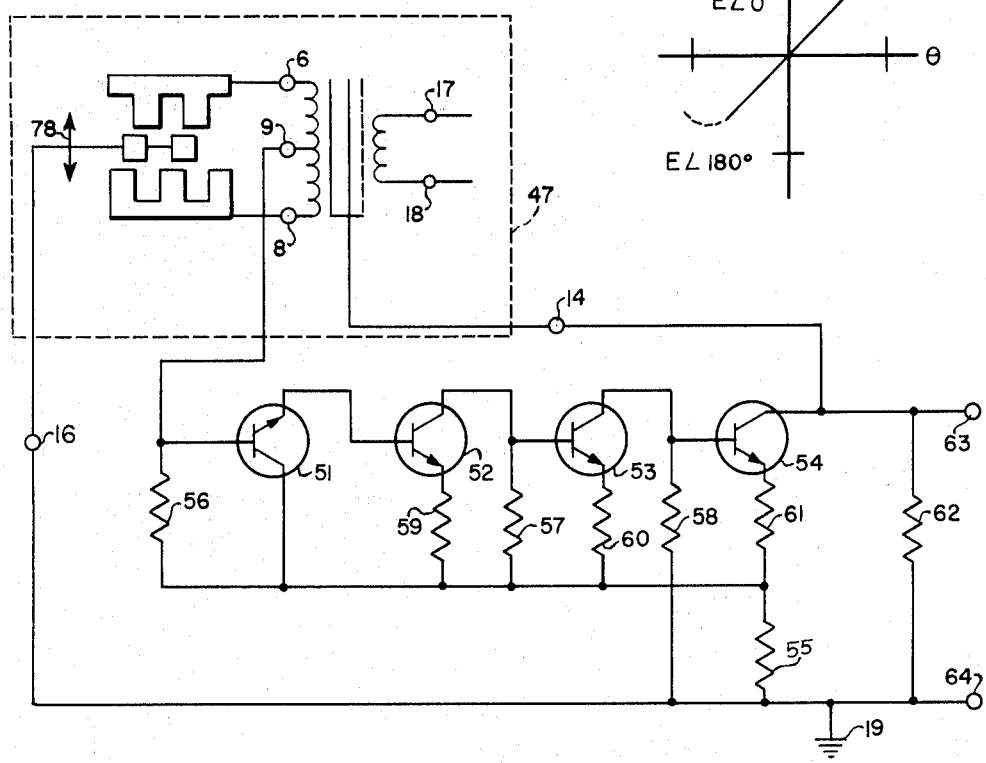
FIGURE 5 is a schematic circuit diagram of a solid-state embodiment of the invention.

If desired, the vacuum tube circuit for providing the desired impedance match between the transducer patterns and the output terminal of the transducer, may be replaced by a solid-state circuit such as that shown in FIGURE 5.

Referring now to FIGURE 5, there is shown in schematic form, the electrostatic transducer of the invention having an integral transistor amplifier circuit for matching the high impedance signal source to the low impedance of the utilization circuits to which the apparatus is applied. The circuit elements within dotted outline 47 correspond to similar elements having like numbers in FIGURE 2.

By employing negative feedback, voltage gain is exchanged for input impedance in the amplifier of FIGURE 5. This amplifier comprises a common-collector stage 51 followed by three direct-coupled common-emitter stages 52-54. High input impedance and gain stability are achieved by overall negative feedback provided by resistor 55. Resistors 56-58 represent the effective impedances of the networks necessary to establish the proper operating bias conditions for the amplifier. Resistors 59-61 comprise the individual stage feedback resistors. The output resistor is indicated at 62. The voltage drop across resistor 55 is in phase with the input voltage. The output appears across resistor 62 at terminals 63 and 64, the latter of which is connected to ground 19.

In a practical construction, the amplifier may have an input impedance of 8 megohms and an output impedance of 600 ohms, assuming a carrier frequency of 400 c.p.s.

Since the output at terminal 63 is connected to core 13 and shield 12, terminal 14 floats above ground at the same potential as the output; thus, there can be no capacitive coupling of the transformer windings to the remainder of the circuit. This "driven shield" arrangement completely isolates any in-phase coupling from the source which might otherwise appear as an error in the output signal.

As in the first-described embodiment, the mechanical input will move the coupler assembly relative to the driver patterns thus shifting the apparent ground reference from one end or the other of the secondary winding of the transformer. This action will raise the potential appearing at the center tap and be sensed as an output signal which is proportional to displacement.

Figure 6:
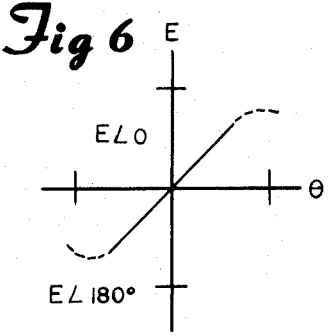
FIGURE 6 is a graphical plot illustrating the transfer function of the transducer of the apparatus of FIGURE 4.

There is shown in FIGURE 6 a graphical plot of the transfer function of a typical construction of the apparatus such as that shown in FIGURE 4. In this graph the error voltage E is represented along the ordinate and the angular position of the relatively movable member is represented along the abscissa. As can be seen, the transfer function is essentially linear and there is a phase reversal as the mechanical input passes through 180 degrees.

The invention may be embodied in other specific forms without departing from the spirit or essential characteristics thereof. The above-described embodiments are therefore to be considered in all respects as illustrative and not restrictive, the scope of the invention being indicated by the appended claims rather than by the foregoing description, and all changes which come within the meaning and range of the claims are therefore intended to be expressed therein.

What is claimed is:
1. An electrostatic transducer comprising:
    a fixed planar dielectric member;
    a pair of driver conductor patterns located on one surface of said dielectric member and cyclically arranged in a series of pole pairs;
    a pair of 180 degree phase-displaced alternating current excitation voltage sources having a common junction therebetween;
    a pair of input terminals one each of which is connected to a corresponding one of said driver conductor patterns for receiving said excitation voltages from said sources;
    a relatively movable planar insulating member parallel to and spaced apart from said dielecetric member;
    a segmented coupler conductor pattern located on said insulating member facing said one surface of said dielectric member; the segments of said coupler conductor pattern overlying successive pole pairs of said driver conductor patterns and electrostatically coupled thereto for providing a variable capacitively coupled voltage having an amplitude which is proportional to the relative displacement between said members;
    a first output terminal connected to said common junction;
    a second output terminal connected to said coupler conductor pattern; and
    circuit means connected to said first and second output terminals for transforming the high impedance of said coupler conductor pattern to match the low impedance of an external utilization circuit.

2. A position transducer as defined in claim 1 wherein said circuit means comprises a cathode follower.

3. A position transducer as defined in claim 1 wherein said circuit means comprises an emitter follower.

4. A position transducer as defined in claim 1 wherein the first driver conductor pattern of said pair of driver conductor patterns comprises a plurality of uniform rectangular conductive areas electrically joined along one edge thereof and separated by rectangular non-conductive areas of a size just larger than the size of said conductive areas;
    the second driver conductive pattern of said pair of driver conductor patterns having a complementary intermeshed configuration of said first driver conductor pattern and arranged in an intermeshed relationship with said first driver conductor pattern so as to have a narrow gap of width therebetween;
    and said segmented coupler conductor pattern comprising a plurality of series connected rectangular conducting elements each of which has an area substantially co-extensive with the area of one of said rectangular conductive areas so that said coupler conductor pattern means may be made to overlie first one and then the other of said first and second driver conductor patterns in response to relative rectilinear displacement between said fixed member and said movable member.

5. A position transducer as defined in claim 1 wherein the first driver conductor pattern of said driver conductor patterns comprises a plurality of uniform wedge-shaped conductive areas electrically joined along one edge thereof and separated by wedge-shaped non-conductive areas of a size just larger than the size of said conductive areas;
    the second driver conductor pattern of said pair of driver conductor patterns having a complementary intermeshed configuration with said first conductor pattern, and arranged in an intermeshed relationship with said first conductor pattern so as to have a narrow gap of fixed width therebetween;
    and said segemented coupler conductor pattern comprising a plurality of series connected wedge-shaped conducting elements each of which has an area substantially co-extensive with the area of one of said wedge-shaped conductive areas so that said coupler conductor pattern may be made to overlie first one and then the other of said first and second driver conductor patterns in response to relative angular displacement between said fixed member and said movable member.

(References on following page)

References Cited by the Examiner

UNITED STATES PATENTS

| | | | |
|---|---|---|---|
| 2,674,729 | 4/1954 | Carter | 317—253 |
| 2,914,673 | 11/1959 | Levin et al. | 328—155 |
| 3,068,457 | 12/1962 | Nevius | 317—249 |
| 3,125,716 | 3/1964 | Machlis | 317—249 X |

FOREIGN PATENTS 1,098,858   2/1961   Germany.

OTHER REFERENCES

Electronic Fundamentals and Applications (Ryder), published by Prentice-Hall, 1959, page 244 and 205 relied on.

"Speeding Missile Trajectory Computation," Control Engineering, vol. 6, No. 4, April 1959, pages 127–128.

DAVID J. GALVIN, *Primary Examiner.*

JOHN W. HUCKERT, ARTHUR GAUSS, *Examiners.*